United States Patent [19]

Kratel et al.

[11] 4,326,852

[45] Apr. 27, 1982

[54] METHOD FOR INCREASING THE BULK WEIGHT OF SILICON DIOXIDE

[75] Inventors: Günter Kratel, Durach-Bechen; Gerhard Dummer, Burgkirchen; Peter Niessner, Sulzberg; Burkhard Grune, Burghausen; Günter Stohr, Durach-Bechen, all of Fed. Rep. of Germany

[73] Assignee: Wacker-Chemie GmbH, Munich, Fed. Rep. of Germany

[21] Appl. No.: 83,718

[22] Filed: Oct. 11, 1979

[30] Foreign Application Priority Data

Oct. 12, 1978 [DE] Fed. Rep. of Germany ....... 2844459

[51] Int. Cl.³ .................... B01D 29/20; B01D 37/00; B01D 46/26; B01J 3/00
[52] U.S. Cl. ................................ 23/293 R; 55/97; 141/12
[58] Field of Search ................ 23/293 R, 313 R; 423/335, 336, 337, 338, 339; 55/97; 141/12, 73, 79, 80

[56] References Cited

U.S. PATENT DOCUMENTS

| | | | |
|---|---|---|---|
| 2,806,771 | 9/1957 | Cuthbertson et al. | 23/313 R |
| 2,879,809 | 3/1959 | Vogt | 141/73 |
| 2,981,298 | 4/1961 | Vogt | 141/73 |
| 3,172,726 | 3/1965 | Burke, Jr. et al. | 423/339 |
| 3,377,945 | 4/1968 | Davis | 141/80 |
| 3,441,387 | 4/1969 | Dye | 23/293 R X |
| 4,126,423 | 11/1978 | Kongsgaarden | 23/293 R |
| 4,126,424 | 11/1978 | Kongsgaarden | 23/293 R |
| 4,162,148 | 7/1979 | Furstenberg | 141/73 |

FOREIGN PATENT DOCUMENTS

| | | | |
|---|---|---|---|
| 1129459 | 5/1962 | Fed. Rep. of Germany | 23/293 R |
| 2628975 | 12/1977 | Fed. Rep. of Germany | 423/335 |

OTHER PUBLICATIONS

Kreuter; "Seifen–O/e–Fette–Wachse"; vol. 100 Nr.4/1974; pp. 101-103.

*Primary Examiner*—Bradley Garris
*Attorney, Agent, or Firm*—Allison C. Collard; Thomas M. Galgano

[57] ABSTRACT

A method for increasing the bulk weight of silicon dioxide with a surface of at least $50 m^2/g$ by means of sub-atmospheric pressure applied at a filter face, wherein the silicon dioxide is moved by means of a conveyor screw, whose longitudinal axis is arranged parallel with respect to the filter face and which preferably has a decreasing thread pitch in feeding direction. Furthermore, the invention relates to the use of the treated silicon dioxide as a filler material for polymeric masses, especially diorganopolysiloxane, which is storeable in the absence of water and when admixed with water at room temperature results in a hardened elastomer mass.

4 Claims, No Drawings

METHOD FOR INCREASING THE BULK WEIGHT OF SILICON DIOXIDE

The present invention relates to a method for increasing the bulk weight of silicon dioxide and to the product produced thereby.

It is already known to increase the bulk weight of silicon dioxide with a surface area of, for example, 250 m$^2$/g by means of sub-atmospheric pressure on a gas permeable face; filter faces being also considered to be gas permeable faces. German Pat. No. 1,129,459, issued Aug. 29, 1963, Deutsche Gold-und Silber-Scheideanstalt, vormals Roessler, is cited by way of example. As compared to the known method for increasing the bulk weight of silicon dioxide with a surface area of at least 50 m$^2$/g, the inventive method is advantageous in that the silicon dioxide treated has a still lower volume. Furthermore, lower or even no losses occur to the final consumers, who are, moreover, not bothered by physical annoyance due to the dust development from the silicon dioxide. Also, the structure of the silicon dioxide is not altered in any disadvantageous manner by the inventive method and the silicon dioxide may be more quickly incorporated as a filler in polymer masses, thereby providing the masses with a higher thixotropy and a higher stability so that articles made from these masses will have smoother surfaces and especially a high degree of extended tear resistance.

It is an object of the present invention to provide a method for increasing the bulk weight of silicon dioxide with a surface area of at least 50 m$^2$/g by means of applying subatmospheric pressure. This can be accomplished according to the invention, by subjecting the silicon dioxide, the bulk weight of which is to be increased, to a sub-atmospheric pressure, by moving the silicon dioxide by means of a conveyor screw, the longitudinal axis of which is arranged parallel with respect to the filter face.

The values described in the specification and claims for the surface area of the silicon dioxide to be treated are defined by the nitrogen adsorption in accordance with the method described in ASTM Technical Publication No. 51,1941, page 95, etc., and mostly called a "BET" method, i.e., BET-values.

As a silicon dioxide with a surface area of at least 50 m$^2$/g, a pyrogenically produced silicon dioxide is preferred (which in the literature is mostly called "fume silica" or "pyrogenic silica"). Such silicon dioxide may be made, for example, by hydrolysis of silicon tetrachloride and/or methyl trichlorosilane at temperatures above 800° C. Further examples for silicon dioxide with a surface area of at least 50 m$^2$/g are dehydrated silicic acid gels with unchanged structure (so called "Aerogels"), Xerogels and other wet precipitated silicon dioxide with a surface area of at least 50 m$^2$/g.

Before this silicon dioxide, with a surface area of at least 50 m$^2$/g is used with the inventive method, the surface may be made water-repellent by reacting with organic silicon compounds such as trimethylethoxysilane, alcohols or fatty acids, or it may be changed in some other manner, for example by reacting with silicon tetrachloride, or amines or amine alcohols, respectively; or by thermic removal of Si-bound hydroxyl groups. If so desired, mixtures of different silicon dioxide species may be used in the inventive method.

Preferably, the silicon dioxide used in the inventive method has a bulk weight (defined in accordance with German industrial standard—DIN—No. 53 468) of 10 to 30 g/l and a surface area of not more than 400 m$^2$/g, in particular, a surface area of 100 to 300 m$^2$/g.

In the method according to the invention, no or at least substantially no pressure is exerted by a mechanical device onto the silicon dioxide at least in direction of the filter face, and preferably also in any other direction. This is also valid for the time subsequent to the method. In accordance with the invention, the silicon dioxide is fed by the conveyor screw in a pressureless manner to the filter face, which is disposed parallel to the longitudinal axis of the conveyor screw. Gas which is present in open hollow spaces of the silicon dioxide particles and between the particles is suctioned off through the filter face by means of the subpressure; the silicon dioxide is thereafter removed from the filter face, thoroughly mixed, and after a repeated moving to and removing from the filter face as well as thorough mixing, is finally removed from the filter face. Preferably, the conveyor screw has a decreasing thread pitch in feeding direction.

The filter face used in the inventive method may consist of a suitable material as used in hitherto known filter faces at which dust-like goods are separated from gases, for example. The material may consist of a web of natural or synthetic, organic or inorganic fibers, which may be modified, if so desired, by thermal or chemical treatment; or it may consist of porous ceramics or also, in particular, of sintered metal.

Preferably, the filter face has the shape of a pipe in which the feeding screw rotates and is disposed in a closed chamber which is connected with a vacuum pump. The pressure used in the inventive method, that is, the sub-pressure or vacuum pressure to which the silicon dioxide with a surface area of at 50 m$^2$/g is subjected, is in the amount of preferably 300 to 900 mbar (abs).

The method of the invention is carried out preferably at room temperature, namely, at 18° to 25° C. If so desired, the method may be carried out at lower or higher temperatures, for example, at 100° to 250° C. The throughput amounts preferably to 200 to 350 kg per hr. and per m$^2$ filter face.

Preferably, the silicon dioxide is discharged at the end of the conveyor screw through a discharge opening having a variable cross section. By reducing the cross section of the discharge opening, an additional increase of the bulk weight is made possible. Preferably the bulk weight of the silicon dioxide is increased by the inventive method to 80 to 120 g/l.

After the increase of the bulk weight brought about by the method of the invention, the silicon dioxide may be packaged in the conventional manner. Preferably during packaging, vacuum pressure, in particular intermittent vacuum pressure, is applied.

The silicon dioxide with a surface area of at least 50 m$^2$/g, treated in accordance with the invention may be used in all cases wherein silicon dioxide with a surface area of at least 50 m$^2$/g was used up to now. Examples for such uses are the use as an additive to increase the flowability of powderlike material, as a thickening agent of polar and nonpolar liquids, including lubricating agents, and the use as a filler in polymer masses for making shaped articles and coatings, and the filling or empty spaces, including seals, packings, and the like.

Such polymer masses may be, for example, polymers based on organic polysiloxane masses based on natural or synthetic purely organic rubber polymers or mixed polymers of vinyl chloride, vinyl acetate, styrene and/or ethylene, or polyester, or, for example masses on polyurethane prepolymers of polysulfide pre-polymers which are storeable in the absence of water and which harden at room temperature when water has access.

Masses which are based on organic polysiloxanes may be of the type which harden to elastomers or resin-like products. These masses may furthermore be such which harden or cross-link in the heat mostly at temperatures above 100° C., due to condensation or radical formation, or may be such which harden or cross-link as so-called "Two component systems" or as so-called "Monocomponent systems" at room temperature. They may also be such which harden or crosslink by addition of Si-bound hydrogen on aliphatic multiple binding in the presence of a catalyst promoting the addition, e.g., a platinum compound.

The silicon dioxide which is treated in accordance with the inventive method may be incorporated in the polymer masses in the same manner, but at a shorter time, and in the same quantities as the hitherto known silicon dioxide with a surface area of at least 50 m$^2$/g, for example, by means of a planet mixer.

As mentioned above, the silicon dioxide with a surface area of at least 50 m$^2$/g, which is treated in accordance with the inventive method, imparts to polymeric masses a particular high thixotropy and stability. These characteristics are of particular importance for masses which in the absence of water are storeable and when admixed with water at room temperature can be hardened to an elastomer mass based on a diorganopolysiloxane. That is to say, they are used in so-called "monocomponent systems" which are frequently used for filling joints or seams, for example in buildings, or in land, water, or air vehicles.

Therefore, it also is an object of the present invention to use the silicon dioxide which is treated in accordance with the invention as a filler for polymers storeable in the absence of water and hardenable upon admission of water at room temperature to an elastomer, the preferred polymer being diorganopolysiloxane.

The invention will now be more fully described in a number of examples which are given by way of illustration and not of limitation.

EXAMPLE 1

Pyrogenically produced silicon dioxide which is made by hydrolysis of methyltrichlorosilane at a temperature above 800° C., having a surface area of 174 m$^2$/g and a bulk weight of 17 g/l, was fed through a pipe by means of a conveyor screw with 40 r.p.m.; the cross-section of the screw is 300 mm and the thread pitch of this screw decreasing in the feeding direction corresponding to the volume decrease of the silicon dioxide. The pipe has a cross-section of 303 mm and is constructed as a double jacket housing at a length of 2000 mm, the inner jacket consisting of a pipe made of sintered metal having a pore width of 20 micrometer (V$_2$A Siperm R 20-the term "Siperm" being a registered trademark-Thyssen Edelstahlwerke AG, Dortmund, BRD). The pressure in the inner space of the double jacket housing is 840 mbar (abs.). The silicon dioxide is fed through the pipe in a quantity of 400 kg per hr. or 210 kg per hr. and per m$^2$ filter face. After discharging from the pipe through the discharge opening whose cross-section is variable by means of a suitable shutter which adjusts the discharge opening to a cross-section of 200 mm, the silicon dioxide has a bulk weight of 87.5 g/l.

Another device which is suitable for the inventive method and treatment of the silicon dioxide is shown in the promotional literature "GERIVAC (registered trademark)—flow-compressor (ventilator)".

EXAMPLE 2

The operating mode described in Example 1 is repeated with the difference that the surface area of the silicon dioxide is made water repellent by means of trimethylethoxysilane before subjecting it to the inventive treatment. After discharge from the pipe, the silicon dioxide has a bulk weight of 93.0 g/l.

EXAMPLE 3

The following components are mixed in the sequence listed below with a planet mixer by means of vacuum or subpressure and in the absence of water:
670 g dimethylpolysiloxane containing in each unit one Sibound hydroxyl group in end position and having a viscosity of about 75 Pa.s,
200 g dimethylpolysiloxane up-blocked by trimethylsiloxy groups with a viscosity of 100 mm$^2$. s$^{-1}$,
45 g Methyltriacetoxysilane,
85 g of the silicon dioxide treated in accordance with Example 1, and
10 g dibutyltin dilaurate.

The total time for mixing is 30 minutes, the admixing of the silicon dioxide taking only 50 seconds. A mass is obtained which is storeable in the absence of water and, when admixed with water at room temperature, hardens to an elastomer. This mass is stable, which is shown by the fact that it does not run from a perpendicular bar and it results in elastomers with a smooth surface.

EXAMPLE 4

The mode of operation of Example 3 is repeated with the difference that instead of 85 g of the silicon dioxide treated in accordance with Example 1, 120 g of the silicon dioxide are used as treated in accordance with Example 2. The admixing of the silicon dioxide takes only 70 seconds.

COMPARISON TEST 1

The mode of operation described in Example 3 is repeated with the difference that the silicon dioxide of Example 1 is used without the treatment described in Example 1. The admixing of the silicon dioxide takes 2.5 minutes.

COMPARISON TEST 2

The mode of operation described in Example 4 is repeated with the difference that the silicon dioxide of Example 2 is used without the treatment described in Example 2. The admixing of the silicon dioxide takes 7 minutes.

COMPARISON TEST 3

The mode of operation of Example 3 is repeated with the difference that instead of the 85 g of the treated silicon dioxide of Example 1 (pH-value: 4.2), 85 g of a pyrogenically made and pressed silicon dioxide with a surface area of 152 m$^2$/g, a bulk weight of 120 g/l and a pH value of 4.15 is used. While the admixing of the silicon dioxide takes only 45 seconds, the mass is not stable and results in elastomers with a rough surface and a tear resistance of only 2.8 N/mm, while the mass in accordance with Example 3 has tear resistance of 4.2 N/mm.

It will be obvious to those skilled in the art that other changes and variations can be made in carrying out the present invention without departing from the spirit and scope thereof, as defined in the appended claims.

What is claimed is:

1. A method for increasing the bulk weight of silicon dioxide having a bulk weight of 10 to 30 g/l and a surface area of at least 50 m$^2$/g by means of employing a sub-atmosperic pressure at a filter face, comprising the steps of:

feeding silicon dioxide whose bulk weight is to be increased to a filter face in a mechanically-pressureless manner by means of a rotating conveying screw, the longitudinal axis of which is disposed parallel to said filter face and which has a decreasing thread pitch in feeding direction, said silicon dioxide being fed at a rate of 200 to 350 kg per hour and per m$^2$ of filter face; and subjecting said silicon dioxide to a pressure of 300 to 900 mbar, absolute, so as to draw off any gases contained therein, whereby the bulk weight of the silicon dioxide is increased to between 80 and 120 g/l.

2. The method in accordance with claim 1, wherein a filter face is used which has the shape of a pipe, in which the conveyor screw rotates, and is disposed in a closed chamber, connected to a vacuum pump.

3. The method in accordance with claim 2, wherein the filter face consists of sintered material.

4. The method in accordance with claim 2, wherein the silicon dioxide discharges at the end of the conveyor screw through a discharge opening, having an adjustable cross-section.

* * * * *